(12) United States Patent
Shin et al.

(10) Patent No.: US 8,812,001 B2
(45) Date of Patent: Aug. 19, 2014

(54) DUAL MODE TERMINAL FOR SUPPORTING ACCESS IN DIFFERENT NETWORK, NETWORK APPARATUS AND OPERATION METHOD THEREOF

(75) Inventors: Hyun Moon Shin, Daejeon (KR); Hyun Soon Shin, Daejeon (KR)

(73) Assignees: Electronics and Telecommunications Research Institute, Daejeon (KR); KT Corporation, Gyeonggi-do (KR)

( * ) Notice: Subject to any disclaimer, the term of this patent is extended or adjusted under 35 U.S.C. 154(b) by 132 days.

(21) Appl. No.: 13/115,202

(22) Filed: May 25, 2011

(65) Prior Publication Data

US 2011/0294539 A1 Dec. 1, 2011

(30) Foreign Application Priority Data

May 25, 2010 (KR) .......................... 10-2010-0048403
Sep. 3, 2010 (KR) .......................... 10-2010-0086497

(51) Int. Cl.
*H04W 36/00* (2009.01)
*H04W 40/00* (2009.01)
*H04W 72/00* (2009.01)

(52) U.S. Cl.
USPC ............................ 455/437; 455/450; 455/445

(58) Field of Classification Search
USPC ................ 455/552.1, 553.1, 426.1, 436–444, 455/450–453, 435.1–435.3, 41.1–41.3; 370/338
See application file for complete search history.

(56) References Cited

U.S. PATENT DOCUMENTS

| | | | | |
|---|---|---|---|---|
| 6,466,802 | B1 * | 10/2002 | Blakeney et al. | 455/552.1 |
| 2004/0044720 | A1 * | 3/2004 | Jang et al. | 709/200 |
| 2006/0025151 | A1 * | 2/2006 | Karaoguz et al. | 455/455 |
| 2006/0209891 | A1 * | 9/2006 | Yamada et al. | 370/468 |
| 2007/0201394 | A1 * | 8/2007 | Jeon et al. | 370/318 |
| 2010/0113088 | A1 * | 5/2010 | Erceg et al. | 455/552.1 |
| 2010/0167741 | A1 * | 7/2010 | Lee | 455/436 |
| 2010/0195608 | A1 * | 8/2010 | Ishizu et al. | 370/329 |

FOREIGN PATENT DOCUMENTS

| | | |
|---|---|---|
| KR | 1020080050180 | 6/2008 |
| KR | 1020090058777 | 6/2009 |
| KR | 1020100001074 A | 1/2010 |

* cited by examiner

*Primary Examiner* — Daniel Lai
(74) *Attorney, Agent, or Firm* — Nelson Mullins Riley & Scarborough LLP; Anthony A. Laurentano, Esq.; Lewis Lee, Esq.

(57) ABSTRACT

Provided are a dual mode terminal for supporting an access in a different network, a network apparatus, and an operation method thereof. The dual mode terminal may include: an interface to receive first network information from a first network apparatus and to receive second network information from a second network apparatus in response to each network information request; a selection unit to select a single network apparatus based on the first network information and the second network information; and a processing unit to transmit a call connection request to the selected network apparatus, and to control a communication with the selected network apparatus depending on whether the selected network apparatus allows a call connection.

4 Claims, 7 Drawing Sheets

DUAL MODE TERMINAL FOR SUPPORTING ACCESS IN DIFFERENT NETWORK, NETWORK APPARATUS AND OPERATION METHOD THEREOF

CROSS-REFERENCE TO RELATED APPLICATIONS

This application claims the benefit of Korean Patent Application No. 10-2010-0048403, filed on May 25, 2010, and Korean Patent Application No. 10-2010-0086497, filed on Sep. 3, 2010, in the Korean Intellectual Property Office, the disclosures of which are incorporated herein by reference.

BACKGROUND

1. Field of the Invention

The present invention relates to a dual mode terminal for supporting an access in a different network that may select a network to be connected, using a quality of service (QoS) based on a service cost, a network apparatus, and an operation method thereof.

2. Description of the Related Art

Currently, a scheme of integrating a wireless local area network (WLAN) and a cellular network may include a loose coupling scheme and a tight coupling scheme. The tight coupling scheme enables information and resources between two integrated networks to be shared. The loose coupling scheme may guarantee only a seamless operation since networks are independently operated. In this case, it may be difficult for a terminal to appropriately share entire resources of the two networks. When resources are effectively used in a wireless integration network employing the loose coupling scheme, there is a desire for a resource management method that may reflect an independent characteristic of a network.

Accordingly, a dual mode terminal migrating between two contentious wireless networks in which a Universal Mobile Telephone System (UMTS) cellular network and a WLAN are integrated in a loose coupling form may be used. Here, the UMTS cellular network may employ a mobile communication technology using, as a technology standard, a wideband code division multiple access (WCDMA) that is one of European third generation (3G) technologies. In the wireless integrated network, there is a need for a method for a network selection, a call admission control, and a data rate assignment.

Accordingly, proposed are a method for determining a handover between different networks according to an area mobility through reading of an area identifier within a predetermined district, and a call establishment control method for admitting a new call when rates of non-assignment resource blocks of an uplink and a downlink for an amount of time from a point in time when a call establishment request is received to a just-before monitoring unit time are respectively greater than or equal to call admission thresholds of the uplink and the downlink.

However, the above technology corresponds to a method that simply considers an area identification and thus, disregards a method with respect to a selection right of a user that is a characteristic of a different network. Accordingly, the above technology has no great difference with a method in a current homogeneous network and is limited to the same network even in a call admission control. Since a QoS reference value for each service type is ignored, the above technology may not satisfy a characteristic of a different network and a minimum QoS for each call.

Accordingly, there is a desire for a technology that may select a network based on a user preference in a circumstance where a terminal may access all the different networks, and may classify a sensitive quality characteristic based on a service type and determine whether a call requesting a connection is to be admitted.

SUMMARY

An aspect of the present invention provides a technology that may select a network from network accessible by a terminal, using a quality of service (QoS) based on a service cost, and thereby may provide a better service.

According to an aspect of the present invention, there is provided a dual mode terminal for supporting an access in a different network, including: an interface to receive first network information from a first network apparatus and to receive second network information from a second network apparatus in response to each network information request; a selection unit to select a single network apparatus based on the first network information and the second network information; and a processing unit to transmit a call connection request to the selected network apparatus, and to control a communication with the selected network apparatus depending on whether the selected network apparatus allows a call connection.

According to another aspect of the present invention, there is provided a network apparatus, including: a prediction unit to predict quality information of a network in response to a network information request received from a terminal; a calculation unit to calculate network information using the quality information, and transmit the calculated network information to the terminal as a response to the network information request; and a control unit to identify a service type from a call connection request when the call connection request is received from the terminal, and to determine whether a call connection of the terminal is to be allowed, based on the identified service type and the quality information.

According to still another aspect of the present invention, there is provided an operation method of a dual mode terminal for supporting an access in a different network, the method including: receiving first network information from a first network apparatus and receiving second network information from a second network apparatus in response to each network information request; selecting a single network apparatus based on the first network information and the second network information; and transmitting a call connection request to the selected network apparatus, and controlling a communication with the selected network apparatus depending on whether the selected network apparatus allows a call connection.

According to yet another aspect of the present invention, there is provided an operation method of a network apparatus, the method including: predicting quality information of a network in response to a network information request received from a terminal; calculating network information using the quality information, and transmitting the calculated network information to the terminal as a response to the network information request; and identifying a service type from a call connection request when the call connection request is received from the terminal, and determining whether a call connection of the terminal is to be allowed, based on the identified service type and the quality information.

According to embodiments of the present invention, it is possible to provide a better service by selecting a network from network accessible by a terminal, using a QoS based on a service cost.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a dual mode terminal for supporting an access in a different network and a network apparatus, and an operation method thereof according to an embodiment of the present invention will be described with reference to the accompanying drawings.

Figure 1:
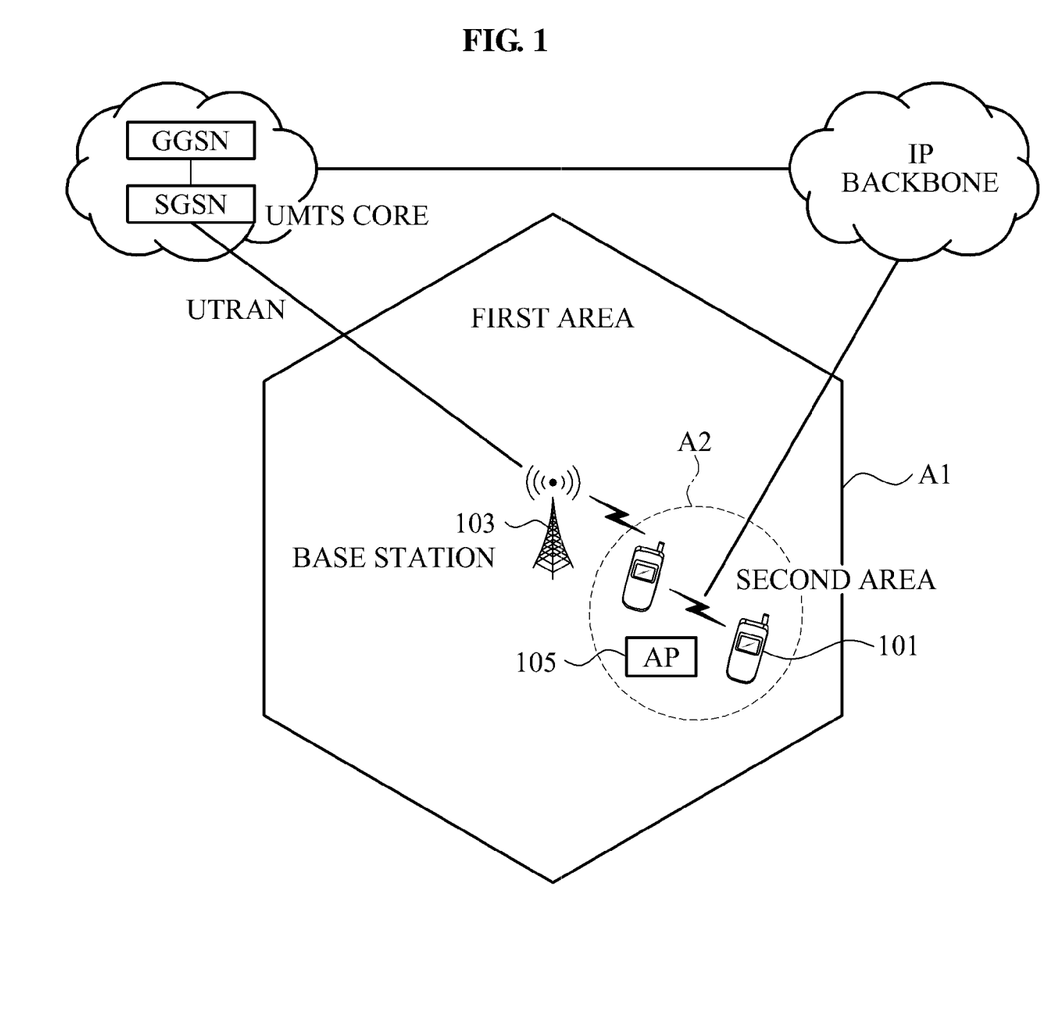
FIG. 1 is a diagram illustrating a network environment employing a dual mode terminal for supporting an access in a different network and a network apparatus according to an embodiment of the present invention.

FIG. 1 is a diagram illustrating a network environment employing a dual mode terminal for supporting an access in a different network and a network apparatus according to an embodiment of the present invention.

Referring to FIG. 1, the network environment may include a terminal 101, a first network apparatus 103, and a second network apparatus 105.

The terminal 101 may perform a network selection of a new call in a second area A2 and a call connection request to a network apparatus based on the selected network, and may perform a network selection of a handoff call migrating from a first area A1 to the second area A2 and a call connection request to a network apparatus based on the selected network. Here, the terminal 101 may select a network with a relatively better quality of service (QoS) to be provided, compared to a cost that a user is expected to pay, based on network information provided from the first network apparatus 103 and the second network apparatus 105. For example, the network information may include a QoS and a cost per packet.

The terminal 101 may communicate with a network apparatus having transmitted a call connection admission message in response to a call connection request, between the first network apparatus 103 and the second network apparatus 105.

The first network apparatus 106 may be an apparatus based on a wideband code division multiple access (WCDMA) network, for example, a base station. The first network apparatus 103 may form an integrated network with the second network apparatus 105 based on a wireless local area network (WLAN) in a loose coupling form. The second network apparatus 105 may be, for example, an access point (AP).

In response to a network information request of the terminal 101, the first network apparatus 103 may provide, to the terminal 101, first network information associated with the WCDMA network. In response to the network information request of the terminal 101, the second network apparatus 105 may provide, to the terminal 101, second network information associated with the WLAN.

Also, in response to a call connection request of the terminal 101, the first network apparatus 103 and the second network apparatus 105 may determine whether to allow a call connection based on quality information of a corresponding network, and may transmit the determination result to the terminal 101.

Specifically, prior to predicting a QoS with respect to a packet, in association with the WCDMA network and the WLAN, in a WCDMA network based cellular system, when a signal to interference and noise ratio (SINR) of a packet with respect to each traffic type is less than a QoS requirement, a delay and loss may occur. In the WLAN, when a packet makes a contention with respect to a network channel, a delay and a loss may occur. As a result, when a packet delay time with respect to each traffic type is greater than the QoS requirement, a packet loss may occur.

Also, in the WCDMA network and the WLAN, to calculate an estimate value, that is, a packet delay time and a packet loss rate of quality information, it is possible to indicate a traffic type $k \in \{rt, nrt\}$ in a network area $j \in \{u, w\}$. Here, rt denotes real-time data and nrt denotes a non-real-time data. Also, it is possible to indicate that $n_{k,j}$ calls are present in each network area. Each call may generate a packet according to a Poisson distribution at a ratio of $$\delta_{k,j}\left(=\frac{r_{k,j}}{\beta_{k,j}} \times \varepsilon_j\right).$$

Here, $r_{k,j}$ denotes a data rate assigned to a call of a traffic type k in a network j, and $\beta_{k,j}$ denotes a packet size of a bit unit. Each call may transmit a data frame that is divided by a slot time $\varepsilon_j$. A single packet including $\beta_{k,j}$, bits may be transmitted within a single time slot. Basically, when the packet is not successfully transmitted, all of both networks may attempt retransmission until a packet delay does not exceed a limit time.

Figure 2:
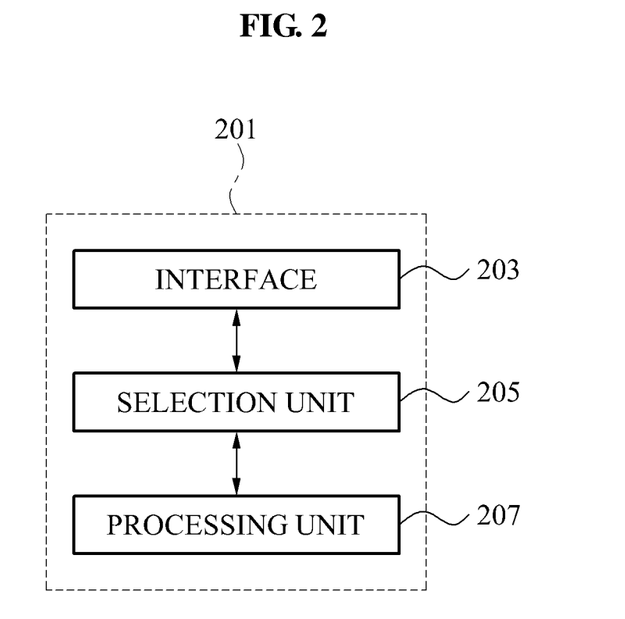
FIG. 2 is a block diagram illustrating a configuration of a dual mode terminal for supporting an access in a different network according to an embodiment of the present invention.

FIG. 2 is a block diagram illustrating a configuration of a dual mode terminal 201 for supporting an access in a different network according to an embodiment of the present invention.

Referring to FIG. 2, the dual mode terminal 201 may include an interface 203, a selection unit 205, and a processing unit 207.

In response to each network information request, the interface 203 may receive first network information from a first network apparatus, and receive second network information from a second network apparatus. Here, each of the first network information and the second network information may be a gain value indicating a QoS based on a service cost per packet in a corresponding network of each of the first network apparatus and the second network apparatus.

The selection unit 205 may select a single network apparatus based on the first network information and the second network information. Specifically, the selection unit 205 may calculate a first quality utility value based on the gain value received from the first network apparatus, and may calculate a second quality utility value based on the gain value received from the second network apparatus. Next, the selection unit 205 may compare the first quality utility value and the second quality utility value and thereby select a single network apparatus. For example, when the first quality utility value is greater than the second quality utility value, the selection unit 205 may select the first network apparatus.

Here, the first quality utility value indicates a relationship between a service cost and a QoS for an amount of time when a call connection continues in a first network that is a base of the first network apparatus. The second quality utility value indicates a relationship between a service cost and a QoS for an amount of time when a call connection continues in a second network that is a base of the second network apparatus.

When $n_j$ calls are currently connected with each network, and when a call of the traffic type k is admitted in the network j, an expected efficiency, that is, a quality utility value of a terminal indicating a relationship between a service cost and a QoS of the terminal for an amount of time when the corresponding call continues may be expressed by Equation 1.

$$U(k,j) = \delta_{k,j} S_{k,j} (\bar{g}_{k,j} - c_{k,j}) / \epsilon_j \mu_k \quad \text{[Equation 1]}$$

Here, an expected gain, that is, a gain value $\bar{g}_{k,j}$ may be expressed by Equation 2.

$$\bar{g}_{k,j} = \begin{cases} c_{k,j}, & E[d_{k,j}] = 0 \\ c_{k,j} / E[d_{k,j}], & 0 < E[d_{k,j}] \le D_{k,j} \end{cases} \quad \text{[Equation 2]}$$

When a cost per unit is given, the terminal may have a preference with respect to a network enabling the terminal to have a relatively great utility value. That is, when a utility of the terminal is greater in the first network than in the second network, the selection unit 205 may attempt to access the first network. Conversely, when the utility of the terminal is greater in the second network than in the first network, the selection unit 205 may attempt to access the second network. When the expected utility does not correspond to both circumstances and is the same, the selection unit 205 may select one network from the first network and the second network and may attempt to access the selected network.

Also, according to a user preference, the selection unit 205 may also select a network apparatus based on the selected network.

The processing unit 207 may transmit a call connection request to the selected network apparatus, and may control a communication with the selected network apparatus depending on whether the selected network apparatus allows a call connection. For example, the processing unit 207 may transmit the call connection request to the first network apparatus. When a call connection admission message is received from the first network apparatus, the processing unit 207 may communicate with the first network apparatus.

The processing unit 207 may verify whether the dual mode terminal is positioned in an overlapping area or a boundary area with respect to service areas. Depending on the verification result, the processing unit 207 may transmit a new connection probability request or a handoff preparation request.

Specifically, the processing unit 207 may verify whether the dual mode terminal is positioned in an overlapping area between a service area of the first network apparatus and a service area of the second network apparatus, or in a boundary area with respect to the service area of the first network apparatus and the service area of the second network apparatus. When the dual mode terminal is positioned in the overlapping area, the processing unit 207 may transmit the new connection probability request to the selected network apparatus as the call connection request.

Also, when the dual mode terminal is positioned in the boundary area, and when a network apparatus unconnected with the dual mode terminal is selected, the processing unit 207 may transmit the handoff preparation request to the selected network apparatus as the call connection request. For example, when the second network apparatus is selected by the selection unit 205 in a state where the first network apparatus is connected, the processing unit 207 may transmit the handoff preparation request to the selected second network apparatus. On the other hand, when the first network apparatus is selected by the selection unit 205 in a state where the first network apparatus is connected, the processing unit 207 may terminate the call connection request.

Figure 3:
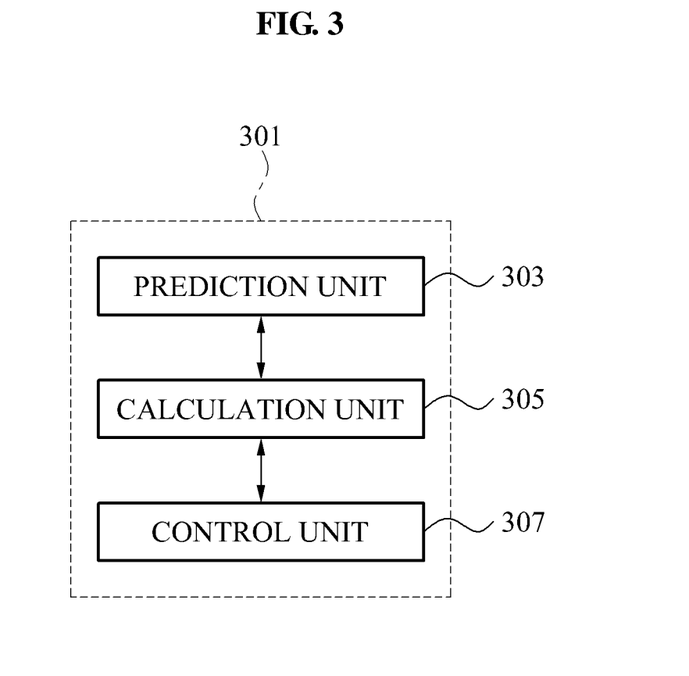
FIG. 3 is a block diagram illustrating a configuration of a network apparatus according to an embodiment of the present invention.

FIG. 3 is a block diagram illustrating a configuration of a network apparatus 301 according to an embodiment of the present invention.

Referring to FIG. 3, the network apparatus 301 may include a prediction unit 303, a calculation unit 305, and a control unit 307.

The prediction unit 303 may predict quality information of a corresponding network in response to a network information request from a terminal. The prediction unit 303 may generate the quality information, for example, a packet delay time and a packet loss rate, using a packet generation rate and a packet processing amount.

i) Universal Mobile Telephone System (UMTS) Cellular Network:

When a single call is admitted in the UMTS cellular network, the prediction unit 303 may measure an SINR with respect to the call based on a transmission power of a terminal, a path gain between the terminal and the network apparatus 301, for example, a base station, an interference decrease according to signal processing, a thermal noise power received at the base station, and the like.

The SINR may be calculated according to Equation 3.

$$\gamma_k(i) = \frac{g_{i,k} P_{i,k}}{\theta_{h,k} \sum_{h=1, i \ne h}^{h_n} g_{h,k} P_{h,k} + N_{k,0}}, \text{ for } k \in \{rt, nrt\} \quad \text{[Equation 3]}$$

In Equation 3, $P_{i,k}$ denotes the transmission power of the terminal at a call connection i, $g_{i,k}$ denotes the path gain between the terminal and the base station (=antenna gain/path loss), and $\theta_{h,k}$ denotes the interference decrease according to signal processing. That is, W denotes a chip transmission rate, $v_{i,k}$ denotes an activity factor with respect to a traffic class k, $\theta_{h,k} \approx 1/G_{i,k}$ is with respect to code division multiple access (CDMA) as signal processing gain $G_{i,k} = W/v_{i,k} r_{k,u}$. $N_{k,0}$ denotes the thermal noise power received at the base station.

To guarantee a data rate, the SINR may need to be greater than or equal to a goal value $\gamma^*_k$. When the above constraints are not satisfied at a start point in time of any time slot, packets may not be transmitted. A relationship between the SINR and a packet may be expressed by Equation 4.

$$\zeta(i) = \begin{cases} 1, & \text{for } \gamma_k(i) \geq \gamma_k^* \\ 0, & \text{for } \gamma_k(i) < \gamma_k^* \end{cases} \quad \text{[Equation 4]}$$

Accordingly, a per-time processing amount of a time slot unit of all the packets generated by all the terminals may be expressed by a processing amount per corresponding time unit, which may be expressed by Equation 5.

$$K_{k,u} = \sum_{i=1}^{n_{k,u}} \zeta(i) \quad \text{[Equation 5]}$$

When it is assumed that the packet processing amount per unit time follows the predetermined ratio $\kappa_{k,u}$ of the Poisson distribution, it is possible to calculate an estimate value with respect to the average packet delay time and the average packet loss rate.

To calculate the estimate value, a transmission delay time $d_{k,u}$ of a packet may need to be calculated. The transmission delay time corresponds to a waiting time at the base station until an admitted data message is transmitted. Since a packet is generated and transmitted according to a Poisson procedure, the transmission delay time corresponds to a probability variable following the average $1/(\kappa_{k,u}-\delta_{k,u})$ of exponential distribution.

In this instance, each packet may have a maximum allowable packet delay time $D_{k,u}$. Accordingly, when the packet delay time of each call is less than or equal to an allowable time, a corresponding packet may be determined to be successfully transmitted. Conversely, when the packet delay time is greater than the allowable time, the packet transmission may be determined as a failure. In this instance, the packet not transmitted until the maximum allowable packet delay time may be processed to have been lost. Then, a packet load in a predetermined time slot may be expressed by $\rho_{k,u}=\delta_{k,u}/\kappa_{k,u}$. Based on this, a probability that the packet is successfully transmitted may be calculated. In an opposite case, the packet loss rate may be calculated. The probability that the packet may be successfully transmitted may be calculated according to Equation 6.

$$S_{k,u}=P(d_{k,u} \leq D_{k,u})=1-\rho_{k,u}e^{-(\kappa_{k,u}-\delta_{k,u})D_{k,u}},_{(D_{k,u}\geq 0)} \quad \text{[Equation 6]}$$

The average packet delay time may be calculated using the same scheme. The average packet delay time may be calculated according to Equation 7.

$$\overline{D}_{k,u}=E[d_{k,u}]=\delta_{k,u}/\kappa_{k,u}(\kappa_{k,u}-\delta_{k,u}) \quad \text{[Equation 7]}$$

The present invention may apply the average packet delay time and the average packet loss rate as the estimate value.

ii) WLAN:

A Distributed Coordination Function (DCF) access method of an Institute of Electrical and Electronics Engineers (IEEE) 802.11 standard may be based on a subcarrier detection multiple access method having a carrier sense multiple access with collision avoidance (CSMA/CA) protocol. A terminal having a packet to be transmitted may sense a channel and may transmit a packet. When the terminal detects that the channel is in service, the terminal may start a backoff procedure and then wait until the channel does not provide a service during a DCF Inter Frame Space (DIFS) time.

In an IEEE 802.11 Media Access Protocol (MAC), when a single terminal is in collision, an exponential backoff may be performed. In the case of collision, each terminal may select a discrete random variable $f(0,CW_m-1)$ from a uniform distribution within the range of $\{0, 1, \ldots, CW_m-1\}$. Here, $CW_m$ denotes a contention window and m denotes a total number of collisions. That is, a number of collisions corresponds to a number of executions used until a first success is acquired. Accordingly, the number of collisions may be expressed as a probability variable following a geometric distribution, as given by Equation 8.

$$p(m) = \left(\frac{n_w-1}{n_w}\right)^m \left(\frac{1}{n_w}\right), m = 0, 1, \ldots \; ; 0 < \frac{1}{n_w} < 1 \quad \text{[Equation 8]}$$

In Equation 8, $n_w=\Sigma_{k\in\{rt,nrt\}}n_{k,w}$ denotes a number of calls in service in the WLAN.

Under the above mechanism, when the number of collisions is greater than a reattempt limit M, a packet transmitted by the terminal may be lost. Accordingly, to successfully transmit the packet, the number of collisions may need to be less than M. The probability $S_{k,w}$ that the packet may be successfully transmitted may be expressed by Equation 9.

$$S_{k,w} = p(m \leq M) = \sum_{m=0}^{M}\left(\frac{n_w-1}{n_w}\right)^m\left(\frac{1}{n_w}\right) \quad \text{[Equation 9]}$$

Accordingly, a packet loss probability of a single call may be expressed by $L_{k,w}=1-S_{k,w}$.

Figure 4:
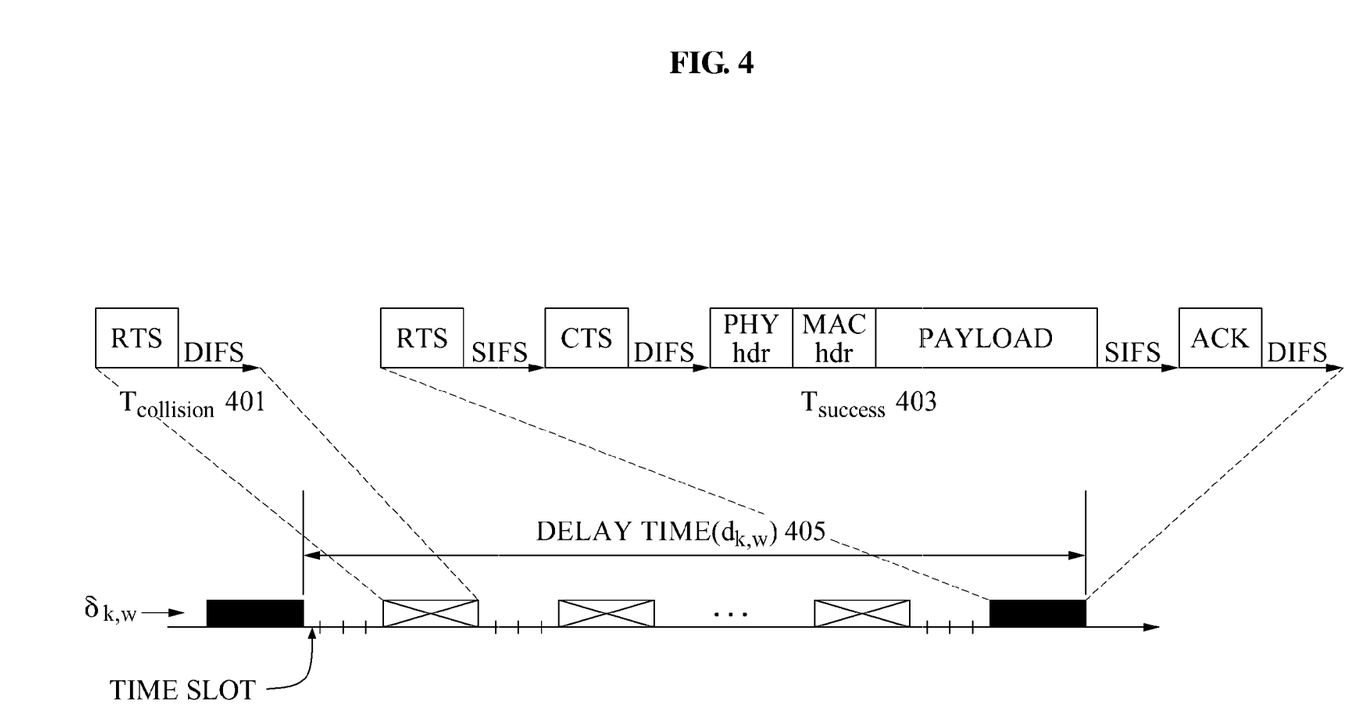
FIG. 4 is a diagram illustrating elements constituting a packet delay time in a wireless local area network (WLAN)

When a number of retransmissions is less than the reattempt limit, it indicates that the packet is successfully transmitted. In this case, a backoff delay time, a length of the successfully transmitted packet, a length of a packet of which the collision occurs, and the like may need to be considered as shown in FIG. 4. The backoff delay time corresponds to the backoff time and the number of collisions. A total backoff delay time until a single packet is successfully transmitted may be expressed by Equation 10.

$$T_{backoff}=\epsilon_w\{p(0)f(0,CW_0-1)+\ldots+p(m)f(0,CW_m-1)\} \quad \text{[Equation 10]}$$

In Equation 10, $CW_m=\min(2^mCW_{min},CW_{max})$ and $m \leq M$. A packet of which collision occurs may be retransmitted after a predetermined time slot. In a first transmission attempt, $CW_m$ may have a value of $CW_{min}$. Every time the transmission fails, this value may increase each twice up to maximum $CW_{max}$. Here, $CW_{min}$ and $CW_{max}$ are predetermined. A collision may occur within a time assigned to a single packet for transmission. The packet delay may be expressed by $m \cdot T_{collision}$ based on a length of a request-to-send (RTS) frame and a DCF Interframe Space (DIFS) time. Here, $T_{collision}$ 401 corresponds to a sum of the RTS frame length and the DIFS time. Finally, a length 403 of a header and a payload of a successfully transmitted packet may be considered. When a collision occurs between RTS frames instead of data packets, a successful packet transmission may be preceded by RTS/CTS(Clear To Send) exchange. Accordingly, until the packet is successfully transmitted, a delay time $d_{k,w}$ 405 may be expressed by a summation of the backoff time ($T_{backoff}$), the length ($T_{success}$) 403 of the successfully transmitted packet, and the length ($T_{collision}$) 401 of the collided packet, as given by Equation 11.

$$d_{k,w} = T_{backoff} + m \cdot T_{collision} + T_{success}$$

$$T_{success} = T_{RTS} + T_{SIFS} + T_{CTS} + T_{DIFS} + T_{PHY} + T_{MAC} + T_{PAYLOAD} + T_{SIFS} + T_{ACK} + T_{DIFS}$$

$$T_{collision} = T_{RTS} + T_{DIFS} \quad \text{[Equation 11]}$$

The packet delay time $d_{k,w}$ may also be expressed in a liner form including a constant and a probability variable m and thus, may be a probability variable having the same distribution. Accordingly, the average delay time of a packet may be expressed by Equation 12.

$$\overline{D}_{k,w} = \epsilon_w \{ p(0)f(0, CW_0-1) + \ldots + p(n_w)f(0, CW_{n_w}-1) \} + n_w \cdot T_{collision} + T_{success} \quad \text{[Equation 12]}$$

The calculation unit 305 may calculate network information based on the quality information. In response to the network information request, the calculation unit 305 may transmit the calculated network information to the terminal 101. The calculation unit 305 may calculate a gain value indicating a QoS based on a service cost per packet, as the network information.

A handoff circumstance where a terminal uses information or signal strength from a base station or an access point may be considered. In this case, when the terminal transmits a request signal, the base station and the access point may transmit a reaction signal. In this active handoff circumstance, it may be assumed that the terminal receives a variety of information from a reacting packet. Accordingly, a single terminal may have preference information of the terminal based on a traffic type. With respect to each network, a single terminal may compare a service cost per packet and obtain a gain $g_{k,j} \geq 0$ indicating a QoS of a service used by the terminal. A packet of which a transmission fails may not obtain a gain. That is, as the packet transmission is delayed, the terminal may obtain a less gain, which may be expressed by Equation 13.

$$g_{k,j} = \begin{cases} c_{k,j}, & d_{k,j} = 0 \\ c_{k,j} / d_{k,j}, & 0 < d_{k,j} \leq D_{k,j} \end{cases} \quad \text{[Equation 13]}$$

In Equation 13, $c_{k,j}$ denotes a cost per packet with respect to a traffic type k in a network j. To unify a measurement unit of a gain and a cost, a conversion to a unit cost per time slot may be performed since a packet is transmitted in a single time slot.

When a call connection request is received from the terminal, the control unit 307 may identify a service type from the received call connection request, and may determine whether a call connection of the terminal 101 is to be allowed based on the identified service type and quality information.

Specifically, when the service type is identified as a real-time service, the control unit 307 may compare a packet delay time included in the quality information with a predetermined packet delay time. When the packet delay time included in the quality information is less than or equal to the predetermined packet delay time, the control unit 307 may allow the call connection of the terminal.

When the service type is classified as a non-real-time service, the control unit 307 may compare a packet loss rate included in the quality information with a predetermined packet loss rate. When the packet loss rate included in the quality information is less than or equal to the predetermined packet loss rate, the control unit 307 may allow the call connection of the terminal.

Figure 5:
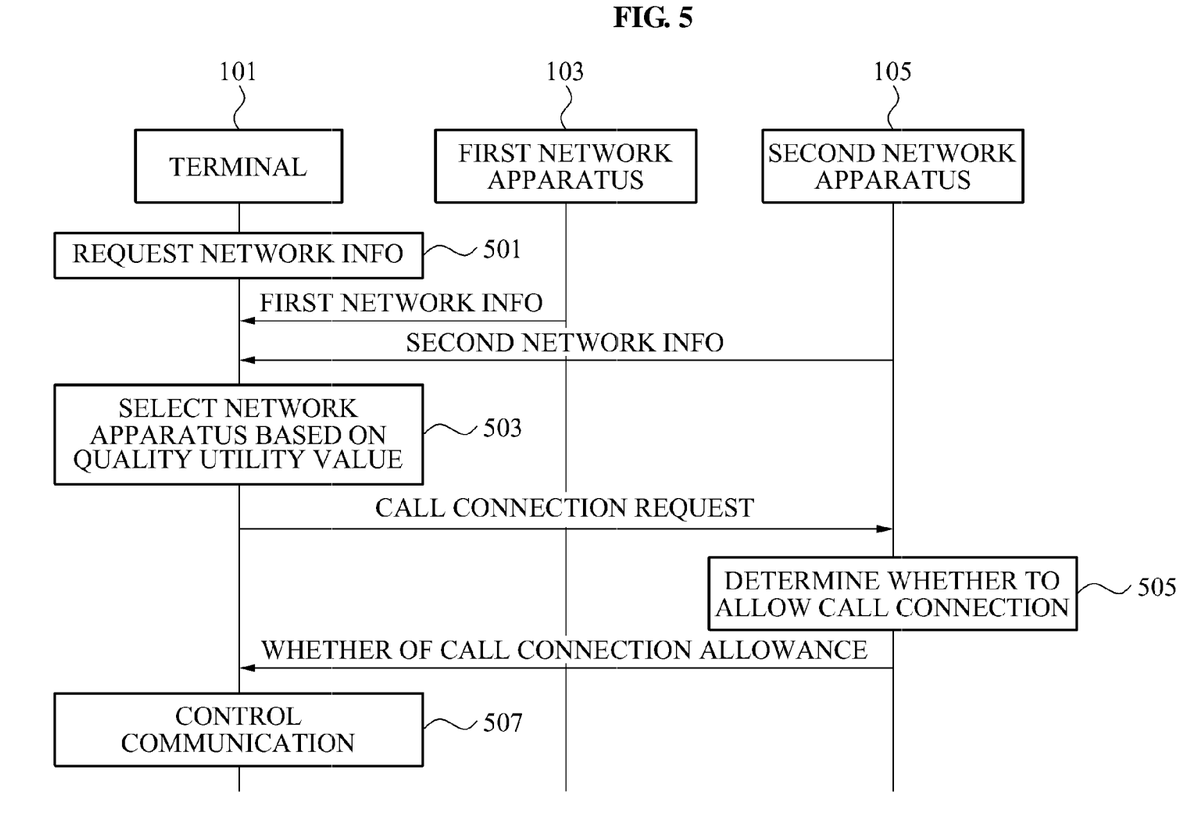
FIG. 5 is a diagram illustrating an operation method of a dual mode terminal for supporting an access in a different network and a network apparatus according to an embodiment of the present invention.

FIG. 5 is a diagram illustrating an operation method of a dual mode terminal for supporting an access in a different network and a network apparatus according to an embodiment of the present invention.

Referring to FIG. 5, in operation 501, in response to each network information request, a terminal 101 may receive first network information from a first network apparatus 103, and may receive second network information from a second network apparatus 105.

The first network apparatus 103 may predict quality information of a WCDMA network in response to the network information request from the terminal 101. Here, the first network 103 may predict the quality information based on a packet generation rate and a packet processing amount. The first network apparatus 103 may calculate the first network information based on predicted quality information, and may transmit the calculated first network information to the terminal 101 in response to the network information request.

Like the first network apparatus 103, the second network apparatus 105 may calculate second network information based on quality information of a WLAN, and may transmit the calculated second network information to the terminal 101.

Here, each of the first network information and the second network information indicates a gain value indicating a QoS based on a service cost per packet in a corresponding network of each of the first network apparatus 103 and the second network apparatus 105.

When the terminal 101 is connected with the first network apparatus 103, the terminal 101 may receive the second network information according to a network information request to the unconnected second network apparatus 105.

In operation 503, the terminal 101 may select a single network apparatus based on the first network information received from the first network apparatus 103 and the second network information received from the second network apparatus 105. When the terminal 101 is connected with the first network apparatus 103, the terminal 101 may use the first network information obtained in connection with the first network apparatus 103, and the second network information received from the second network apparatus 203 according to the network information request.

Specifically, the terminal 101 may calculate a first quality utility value based on a gain value received from the first network apparatus 103, and may calculate a second quality utility value based on a gain value received from the second network apparatus 105. When the second quality utility value is greater than the first quality utility value, the terminal 101 may select the second network apparatus 105.

The terminal 101 may also select a network apparatus based on a selected network, according to a user preference. The terminal 101 may transmit a call connection request to the selected network apparatus.

When the terminal 101 is connected with the first network apparatus 103, the terminal 101 may transmit a handoff preparation request or a connection probability request to the second network apparatus 105.

When the terminal 101 is not connected with the first network apparatus 103 and the second network apparatus 105, the terminal 101 may transmit a new connection probability request or a connection probability request to the second network apparatus 105.

In operation 505, when the call connection request is received from the terminal 101, the second network apparatus 105 may determine whether a call connection of the terminal 101 is to be allowed based on the quality information. Here, the second network apparatus 105 may identify a service type from the call connection request received from the terminal 101, and may determine whether the call connection of the terminal 101 is to be allowed based on the identified service type and quality information.

In operation 507, the terminal 101 may control communication with the second network apparatus 105 depending on whether the call connection is allowed at the selected network apparatus, for example, the second network apparatus 105. That is, when a call connection admission message is received from the second network apparatus 105, the terminal 101 may control the communication with the second network apparatus 105. When a call connection rejection message is received, the communication with the second network apparatus 105 may be limited.

Figure 6:
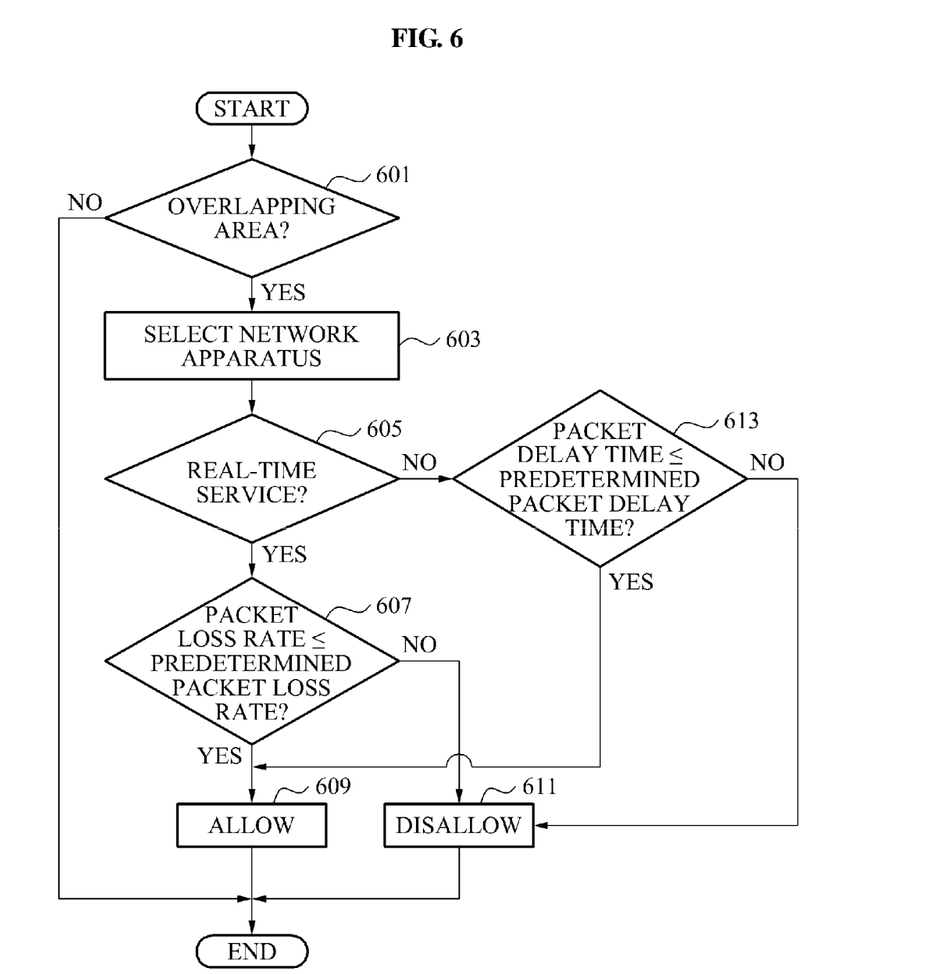
FIG. 6 is a flowchart illustrating an admission control method of a network apparatus with respect to a new call in a dual mode terminal supporting an access in a different network according to an embodiment of the present invention.

FIG. 6 is a flowchart illustrating an admission control method of a network apparatus with respect to a new call in a dual mode terminal for supporting an access in a different network according to an embodiment of the present invention.

Referring to FIG. 6, in operation 601, a terminal may verify whether a current position of the terminal corresponds to an overlapping area between a service area of a first network apparatus and a service area of a second network apparatus. That is, the terminal may verify whether all the connections with the first network apparatus based on a WCDMA network and the second network apparatus based on a WLAN are available.

In operation 603, when the current position corresponds to the overlapping area, that is, when all the connections with the first network apparatus and the second network apparatus are available, the terminal may select a single network apparatus and may transmit a call connection request to the selected network apparatus. Here, the terminal may calculate a first quality utility value based on a gain value received from the first network apparatus, and may calculate a second quality utility value based on a gain value received from the second network apparatus. Next, the terminal may compare the first quality utility value with the second quality utility value and then select a single network apparatus. For example, when the second quality utility value is greater than the first quality utility value, the terminal may select the second network apparatus.

In operation 605, when the call connection request is received from the terminal, the second network apparatus may identify a service type from the received call connection request. When the service type is identified as a real-time service, the second network apparatus may determine whether a call connection of the terminal is to be allowed based on a packet loss rate included in the quality information.

Specifically, in operations 607 and 609, the second network apparatus may compare the packet loss rate and a predetermined packet loss rate. When the packet loss rate is less than or equal to the predetermined packet loss rate, the second network apparatus may allow the call connection of the terminal and may transmit a call connection admission message to the terminal, thereby communicating with the terminal in real time. Conversely, in operations 607 and 611, when the packet loss rate is greater than the predetermined packet loss rate, the second network apparatus may disallow the call connection of the terminal and may transmit a call connection rejection message to the terminal, thereby limiting the real-time communication with the terminal.

When the service type is not identified as the real-time service from the call connection request received from the terminal in operation 605, that is, when the service type is identified as a non-real-time service, the second apparatus may determine whether the call connection of the terminal is to be allowed, using a packet delay time included in the quality information.

In operations 613 and 609, the second network apparatus may compare the packet delay time with a predetermined packet delay time. When the packet delay time is less than or equal to the predetermined packet delay time, the second network apparatus may allow the call connection of the terminal and may communicate with the terminal in non-real time. Conversely, when the packet delay time is greater than the predetermined packet delay time, the second network apparatus may disallow the call connection of the terminal and limit the non-real-time communication with the terminal.

When the current position does not correspond to the overlapping area in operation 601, the terminal may terminate the call connection request.

Figure 7:
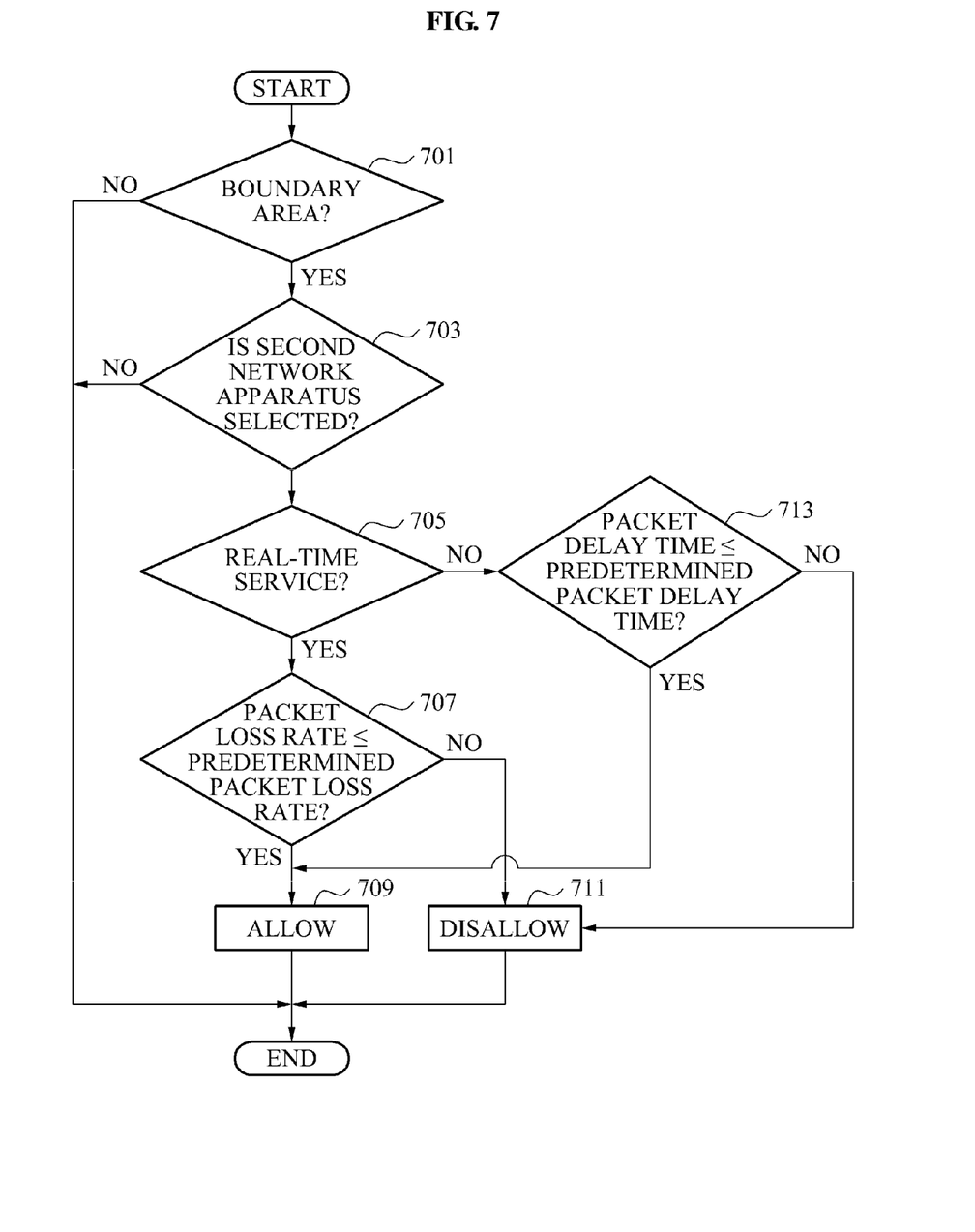
FIG. 7 is a flowchart illustrating an admission control method of a network apparatus with respect to a handoff call in a dual mode terminal for supporting an access in a different network according to an embodiment of the present invention.

FIG. 7 is a flowchart illustrating an admission control method of a network apparatus with respect to a handoff call in a dual mode terminal for supporting an access in a different network according to an embodiment of the present invention.

Referring to FIG. 7, in operation 701, a terminal may verify whether a current position of the terminal corresponds to a boundary region with respect to a service area of a first network apparatus and a service area of a second network apparatus. That is, when the terminal is connected with the first network apparatus based on a WCDMA network, the terminal may verify whether a connection to the second network apparatus based on a WLAN is available, that is, whether a handoff is available. In this instance, the terminal may sense a signal of the second network apparatus and then determine whether a signal strength gradually increases, thereby verifying the handoff availability.

When the current position corresponds to the boundary region, that is, when the handoff from the first network apparatus to the second network apparatus is available, the terminal may select the second network apparatus.

Here, the terminal may calculate a first quality utility value based on a gain value received from the first network apparatus, and may calculate a second quality utility value based on a gain value received from the second network apparatus. Next, the terminal may compare the first quality utility value with the second quality utility value and then select a single network apparatus. For example, when the second quality utility value is greater than the first quality utility value, the terminal may select the second network apparatus.

When the terminal selects the unconnected second network apparatus in operation 703, the terminal may transmit the call connection request to the selected second network apparatus.

In operation 705, when the call connection request is received from the second network apparatus, the second network apparatus may identify a service type from the received call connection request. When the service type is identified as a real-time service, the second network apparatus may determine whether a call connection of the terminal is to be allowed based on a packet loss rate included in the quality information.

Specifically, in operations 707 and 709, the second network apparatus may compare the packet loss rate and a predetermined packet loss rate. When the packet loss rate is less than or equal to the predetermined packet loss rate, the second network apparatus may allow the call connection of the terminal and may transmit a call connection admission message to the terminal, thereby communicating with the terminal in real time. Conversely, in operations 707 and 711, when the packet loss rate is greater than the predetermined packet loss rate, the second network apparatus may disallow the call connection of the terminal and may transmit a call connection rejection message to the terminal, thereby limiting the real-time communication with the terminal.

When the service type is not identified as the real-time service from the call connection request received from the terminal in operation 705, that is, when the service type is identified as a non-real-time service, the second apparatus may determine whether the call connection of the terminal is to be allowed, using a packet delay time included in the quality information.

In operations 713 and 709, the second network apparatus may compare the packet delay time with a predetermined packet delay time. When the packet delay time is less than or equal to the predetermined packet delay time, the second network apparatus may allow the call connection of the terminal and may communicate with the terminal in non-real time. Conversely, when the packet delay time is greater than the predetermined packet delay time, the second network apparatus may disallow the call connection of the terminal and limit the non-real-time communication with the terminal.

When the current position of the terminal does not correspond to the boundary region in operation 701, or when the second network is not selected in operation 703, the terminal may terminate the call connection request.

According to embodiments of the present invention, it is possible to select, from networks accessible by a terminal, a network using a QoS based on a service cost, thereby providing an enhanced service.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A dual mode terminal for supporting an access in a different network, comprising:

an interface to receive first network information from a first network apparatus and to receive second network information from a second network apparatus in response to each network information request;

a selection unit to select a single network apparatus based on the first network information and the second network information; and a processing unit to transmit a call connection request to the selected network apparatus, and to control a communication with the selected network apparatus depending on whether the selected network apparatus allows a call connection, wherein the first network information is calculated from first quality information that is predicted by the first network apparatus based on a first packet generation rate and a first packet processing amount of a first network and includes a first gain value indicating a first quality of service (QoS) based on a first service cost per packet in the first network, wherein the second network information is calculated from second quality information that is predicted by the second network apparatus based on a second packet generation rate and a second packet processing amount of a second network and includes a second gain value indicating a second quality of service (QoS) based on a second service cost per packet in the second network, wherein the selection unit calculates a first quality utility value and a second quality utility value indicating a relationship between a QoS and a service cost corresponding to an amount of time when the call connection continues, based on the first gain value and the second gain value, and selects the first network apparatus when the first quality utility value is greater than the second quality utility value, or selects a network apparatus based on a network selected and input from a user.

2. The dual mode terminal of claim 1, wherein:

the processing unit verifies whether the dual mode terminal is positioned in an overlapping area between a service area of the first network apparatus and a service area of the second network apparatus, or in a boundary area with respect to the service area of the first network apparatus and the service area of the second network apparatus, and when the dual mode terminal is positioned in the overlapping area, the processing unit transmits a new connection probability request to the selected network apparatus as the call connection request, and when the dual mode terminal is positioned in the boundary area, and when a network apparatus unconnected with the dual mode terminal is selected, the processing unit transmits a handoff preparation request to the selected network apparatus as the call connection request.

3. An operation method of a dual mode terminal for supporting an access in a different network, the method comprising:

receiving first network information from a first network apparatus and receiving second network information from a second network apparatus in response to each network information request;

selecting a single network apparatus based on the first network information and the second network information; and transmitting a call connection request to the selected network apparatus, and controlling a communication with the selected network apparatus depending on whether the selected network apparatus allows a call connection, wherein the first network information is calculated from first quality information that is predicted by the first network apparatus based on a first packet generation rate and a first packet processing amount of a first network and includes a first gain value indicating a first quality of service (QoS) based on a first service cost per packet in the first network, wherein the second network information is calculated from second quality information that is predicted by the second network apparatus based on a second packet generation rate and a second packet processing amount of a second network and includes a second gain value indicating a second quality of service (QoS) based on a second service cost per packet in the second network, wherein the selecting comprises calculating a first quality utility value and a second quality utility value indicating a relationship between a QoS and a service cost corresponding to an amount of time when the call connection continues, based on the first gain value and the second gain value, and selecting the first network apparatus when the first quality utility value is greater than the second quality utility value, or selecting a network apparatus based on a network selected and input from a user.

4. The method of claim 3, further comprising:

verifying whether the dual mode terminal is positioned in an overlapping area between a service area of the first network apparatus and a service area of the second network apparatus, or in a boundary area with respect to the service area of the first network apparatus and the service area of the second network apparatus, wherein the controlling comprises:

transmitting a new connection probability request to the selected network apparatus as the call connection request when the dual mode terminal is positioned in the overlapping area; and transmitting a handoff preparation request to the selected network apparatus as the call connection request when the dual mode terminal is positioned in the boundary area, and when a network apparatus unconnected with the dual mode terminal is selected.

* * * * *